Figure 11:
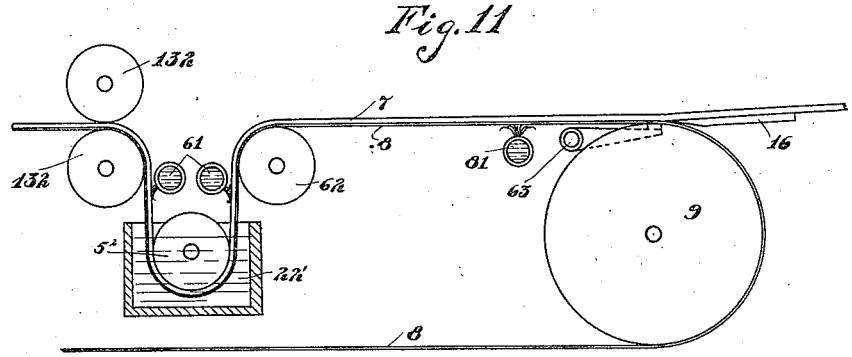

S. M. FORD.
METHOD OF MANUFACTURING PREPARED ROOFING.
APPLICATION FILED OCT. 6, 1916.
1,265,315.
Patented May 7, 1918.
9 SHEETS—SHEET 1.
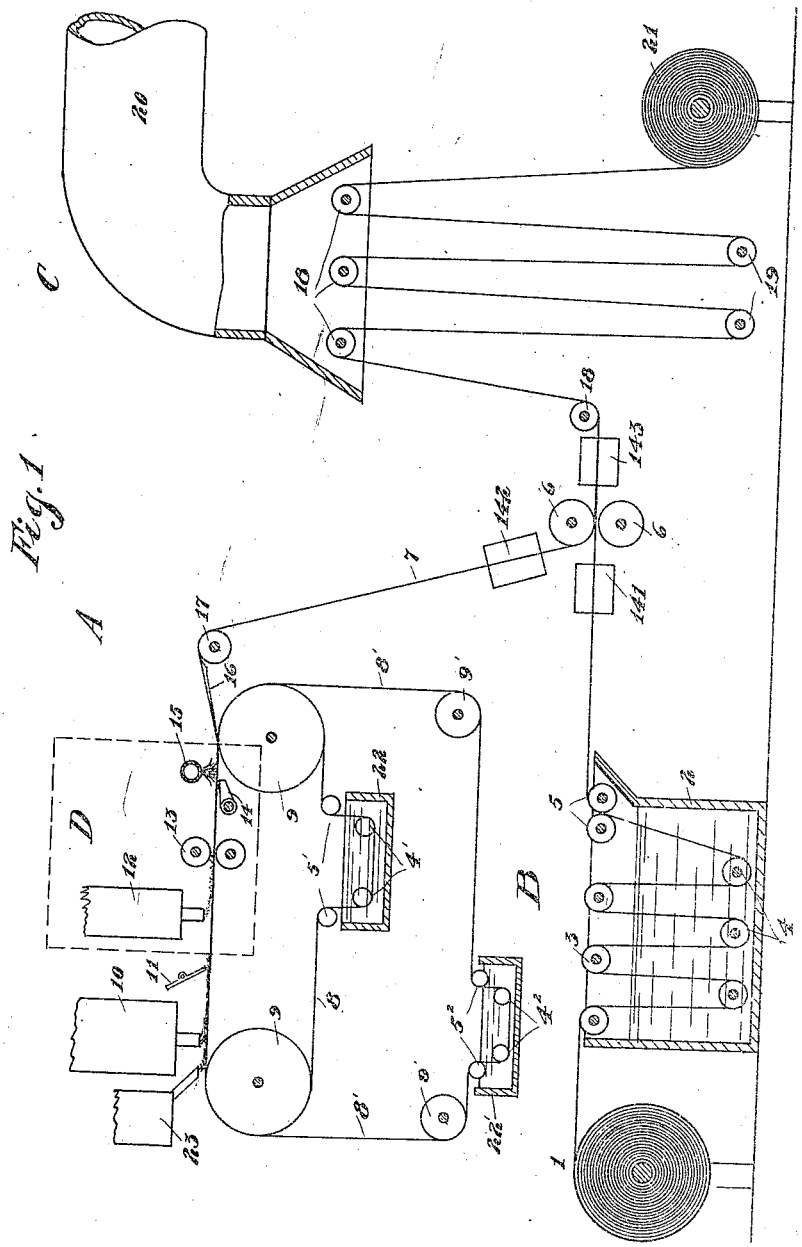
Inventor:
Silas M. Ford.
by C. D. Euochs
Attorney.

S. M. FORD.
METHOD OF MANUFACTURING PREPARED ROOFING.
APPLICATION FILED OCT. 6, 1916.
1,265,315.
Patented May 7, 1918
9 SHEETS—SHEET 2.
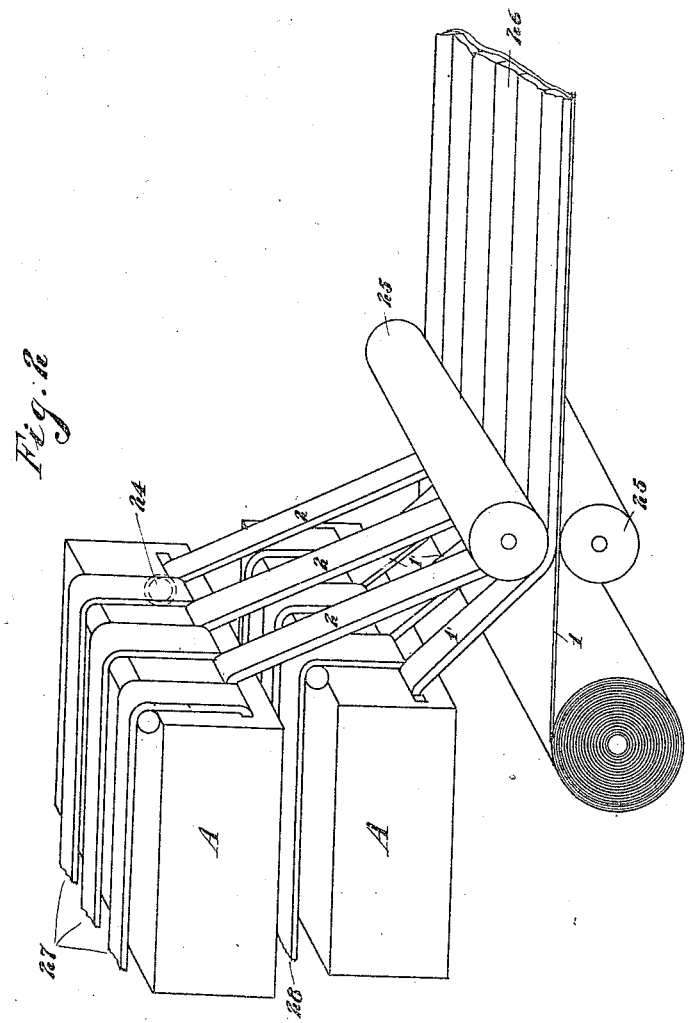
Inventor:
Silas M. Ford,
by C. D. Enochs
Attorney.

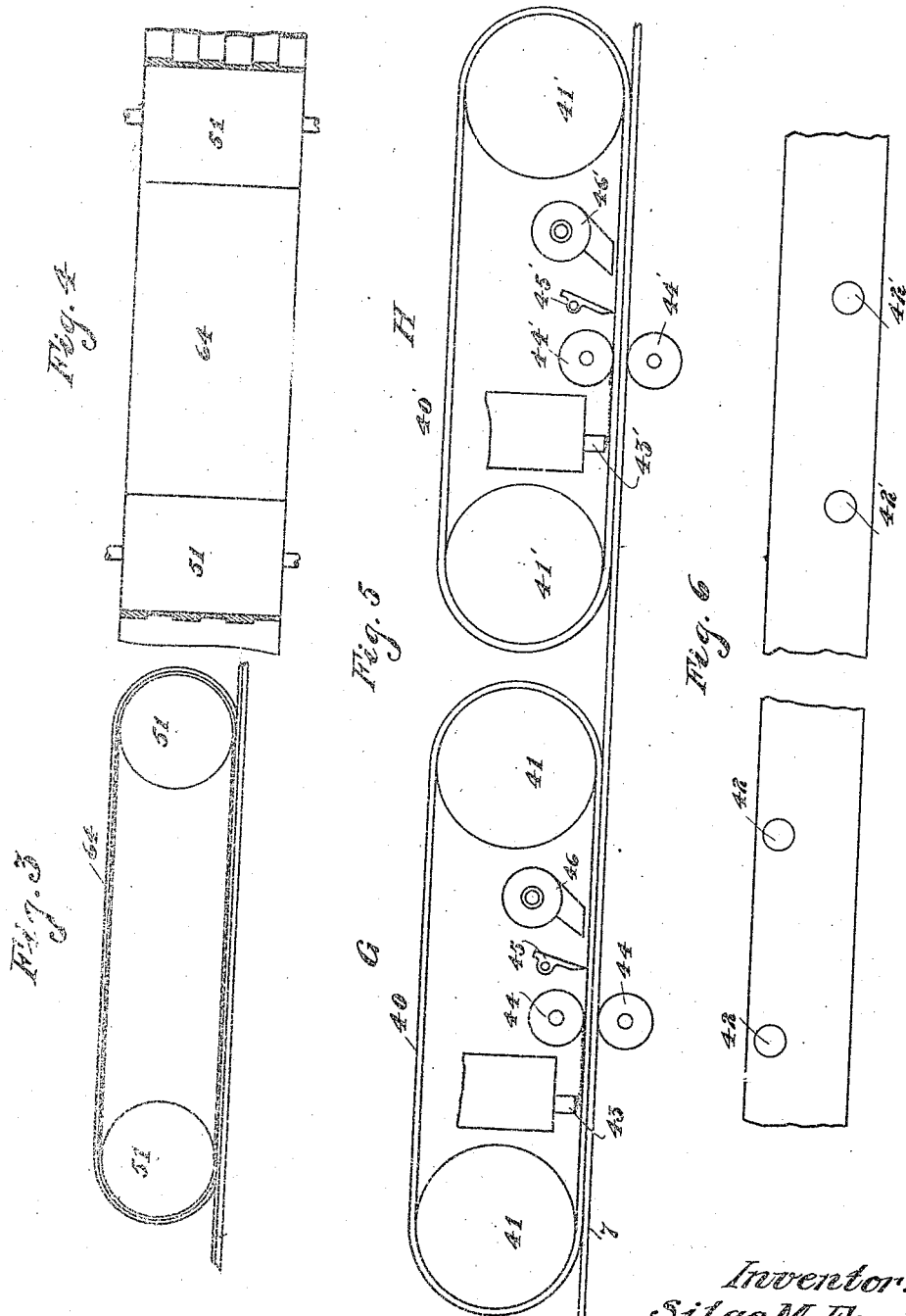

S. M. FORD.
METHOD OF MANUFACTURING PREPARED ROOFING.
APPLICATION FILED OCT. 6, 1916.
1,265,315.
Patented May 7, 1918.
9 SHEETS—SHEET 4.
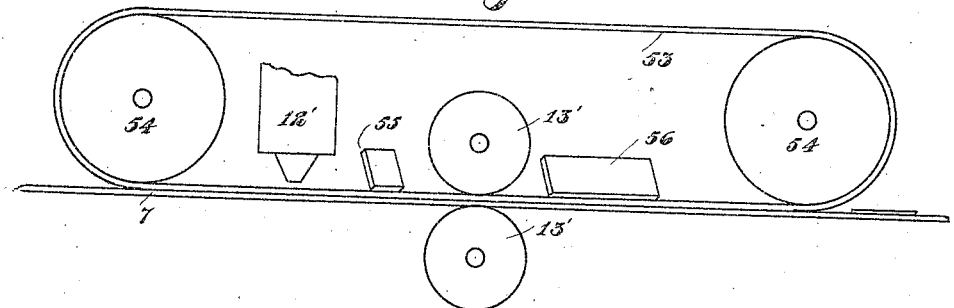
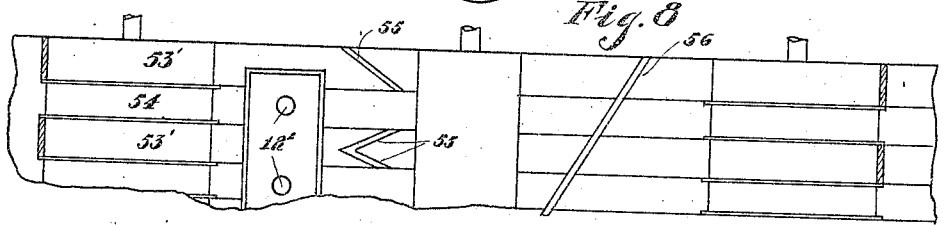
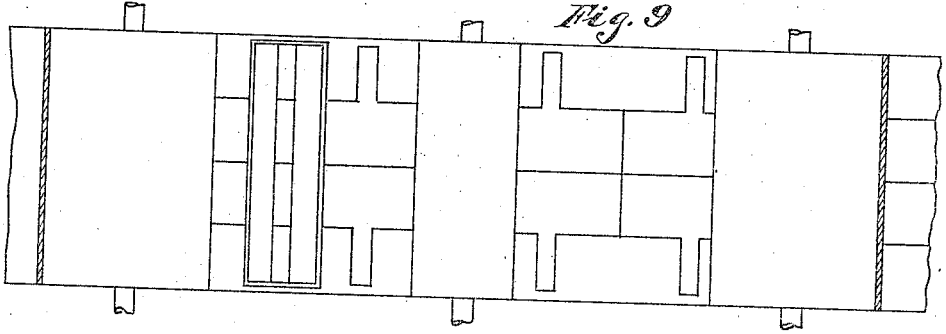
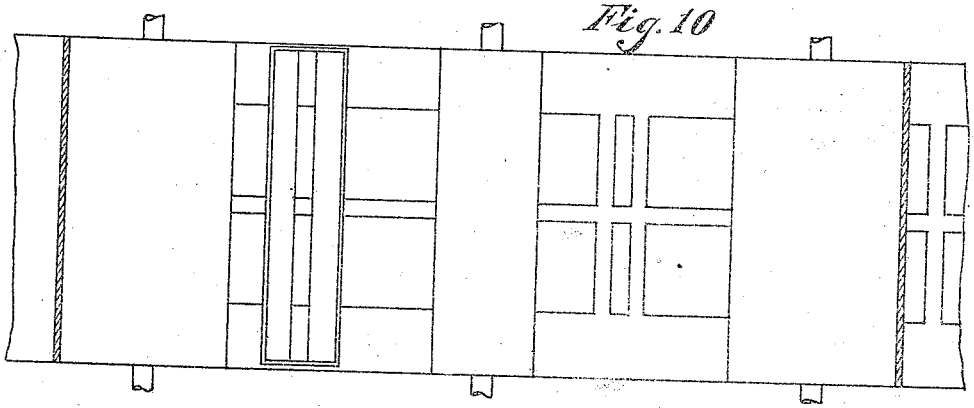
Inventor:
Silas M. Ford.
by C. Enochs
Attorney.

S. M. FORD.
METHOD OF MANUFACTURING PREPARED ROOFING.
APPLICATION FILED OCT. 6, 1916.

1,265,315.

Patented May 7, 1918.
9 SHEETS—SHEET 5.

Inventor:
Silas M. Ford.
by C. D. Enochs
Attorney.

S. M. FORD.
METHOD OF MANUFACTURING PREPARED ROOFING.
APPLICATION FILED OCT. 6, 1916.
1,265,315.
Patented May 7, 1918.
9 SHEETS—SHEET 6.
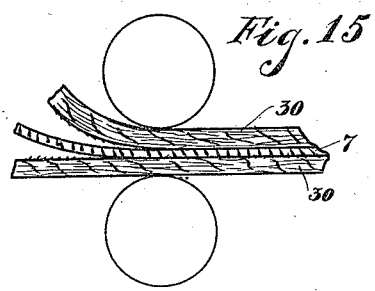
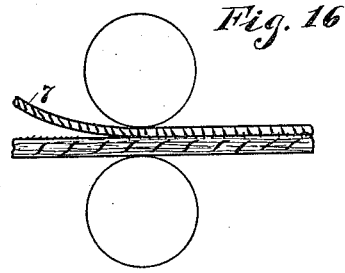
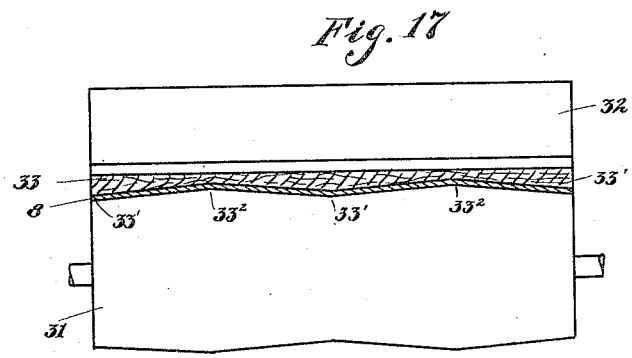
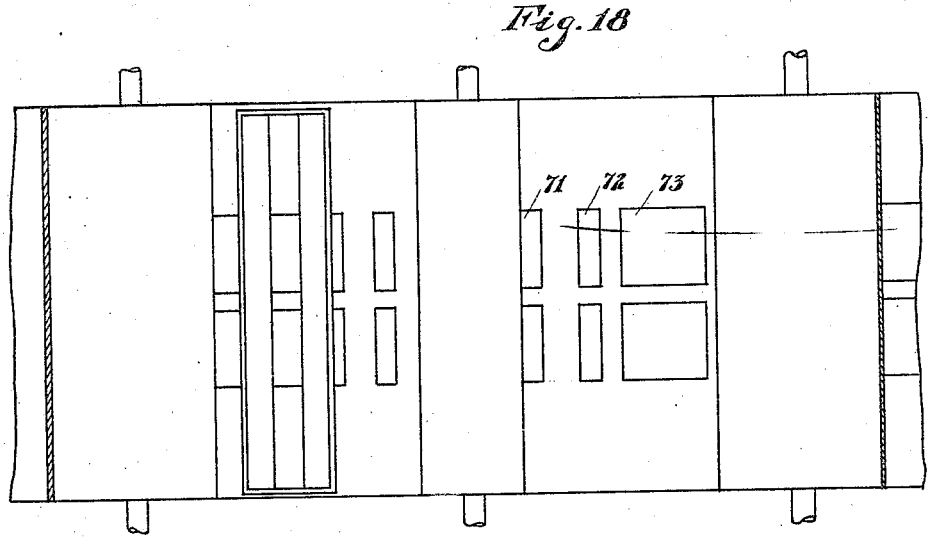
Inventor:
Silas M. Ford.
by C. D. Enochs
Attorney.

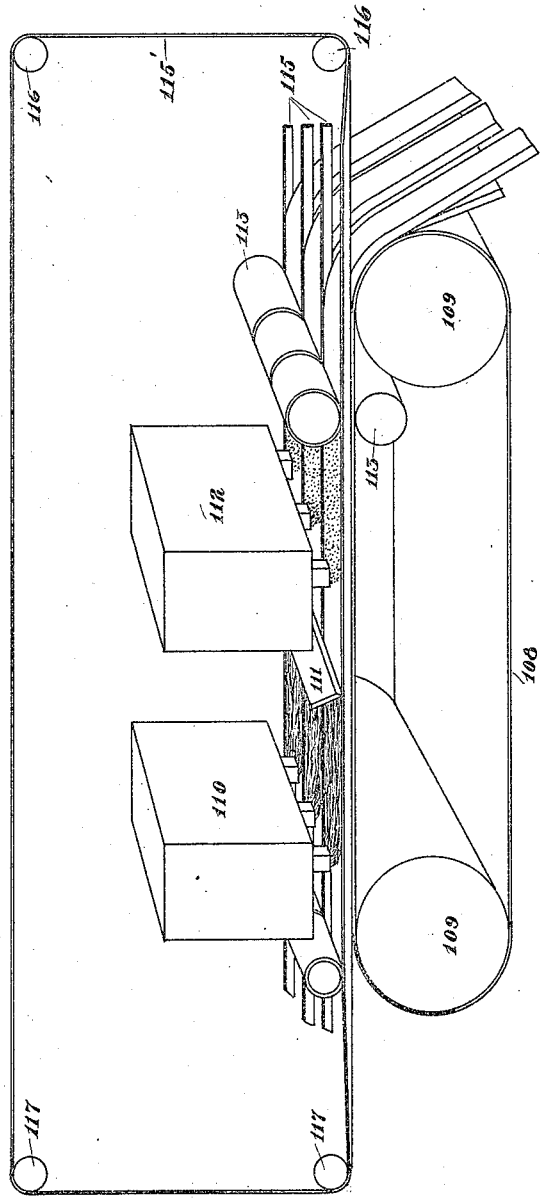

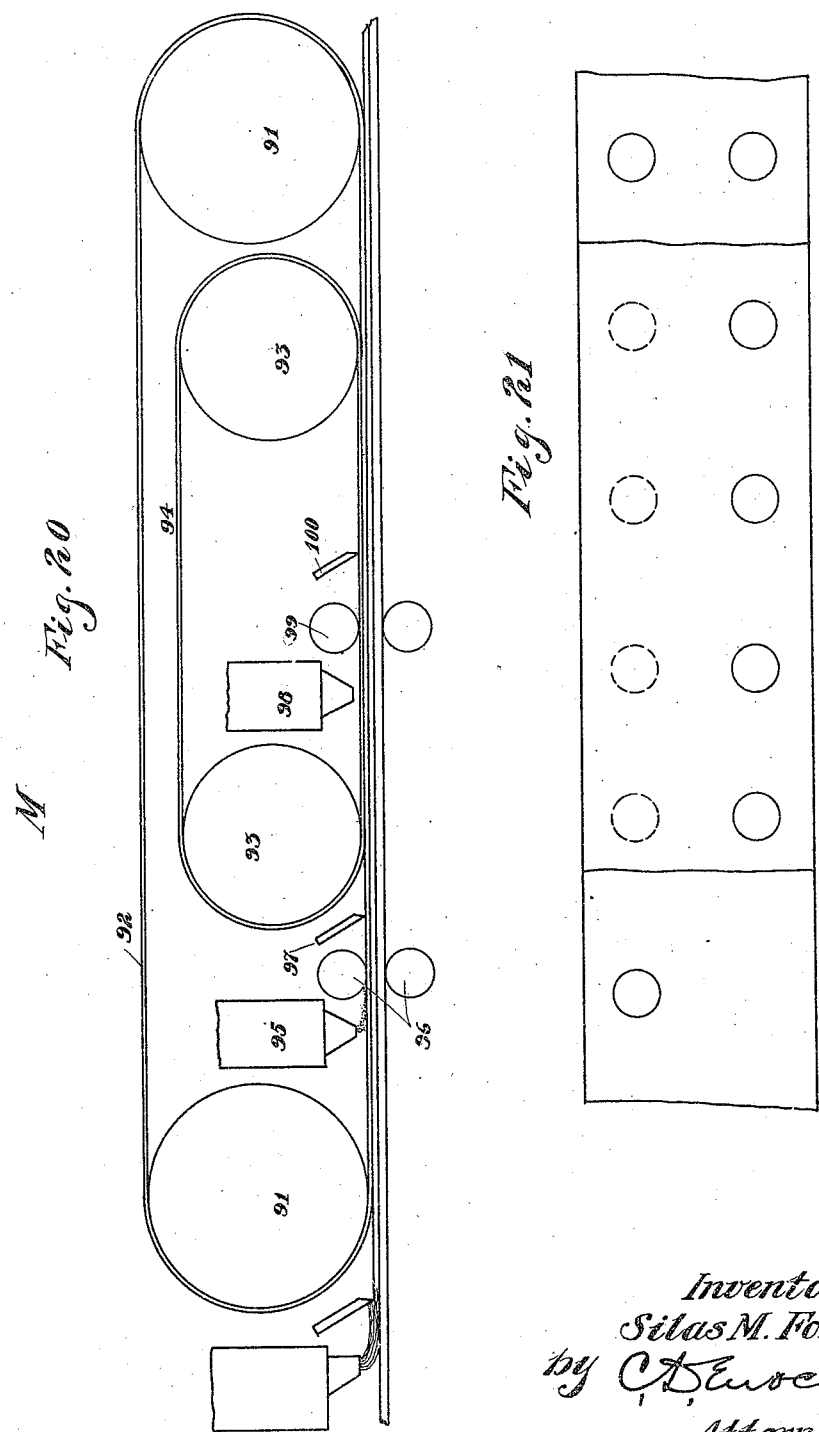

S. M. FORD.
METHOD OF MANUFACTURING PREPARED ROOFING.
APPLICATION FILED OCT. 6, 1916.

1,265,315.

Patented May 7, 1918.
9 SHEETS—SHEET 9.

Inventor:
Silas M. Ford.
by C. D. Enochs
Attorney.

UNITED STATES PATENT OFFICE.

SILAS M. FORD, OF ST. PAUL, MINNESOTA.

METHOD OF MANUFACTURING PREPARED ROOFING.

1,265,315. Specification of Letters Patent. Patented May 7, 1918.

Original application filed February 3, 1916, Serial No. 76,050. Divided and this application filed October 6, 1916. Serial No. 124,185.

*To all whom it may concern:*

Be it known that I, SILAS M. FORD, a citizen of the United States, residing at St. Paul, in the county of Ramsey and State of Minnesota, have invented certain new and useful Improvements in the Methods of Manufacturing Prepared Roofing, of which the following is a specification.

This invention relates to improved methods of manufacturing prepared roofing, and particularly that form of roofing that is built up on a foundation sheet that may or may not be water-proof, by adding thereto other layers or coatings, being a division of my co-pending application Serial #76,050, filed Feb. 3, 1916, bearing the same name.

One object of my invention is to provide a method of manufacturing prepared roofing such that any class of stock may be used as a foundation sheet and combined with a high melting point compound, without deteriorating the stock.

Another object of my invention is to provide a method of manufacturing prepared roofing wherein a foundation sheet is combined with a coating having a given melting point, and an outside coating having a different melting point, each coating being uniformly applied and in such a manner as not to injure the foundation sheet.

Another object of my invention is to provide a method of manufacturing prepared roofing wherein a foundation sheet is combined with a sheet of water-proof compound formed separately from the foundation sheet, so as to form a unit therewith.

Another object of my invention is to provide a method of manufacturing prepared roofing wherein a sheet of water-proof compound has a mineral surfacing applied thereto and the result of this combination then joined with a foundation sheet, so as to form with it a unit sheet of roofing.

Another object of my invention is to provide a method of manufacturing prepared roofing wherein a foundation sheet of water-proof material having fibers sticking upwardly from the top surface of the sheet may be combined with a sheet of separately formed water-proof compound in such a manner that the fibers of the foundation sheet will be thoroughly embedded in the water-proof compound.

Another object of my invention is to provide a method of manufacturing prepared roofing whereby the prepared roofing may be manufactured having different color designs formed of water-proof material in such a manner that the water-proof material is of uniform thickness and strength throughout the design.

Another object of my invention is to provide a method of manufacturing prepared roofing whereby the prepared roofing may be manufactured having different colored stripes running the length of the sheet, and the sheet cut transversely into single strips or unit shingles, so as to form an attractive design when laid upon a roof.

Another object of my invention is to provide a method of manufacturing prepared roofing wherein a mineral surfacing may be embodied in various designs and various colors in such a manner that the thickness of mineral surfacing is uniform, and the lines between various color designs are sharply and clearly defined.

Another object of my invention is to provide a method of manufacturing prepared roofing designed to be cut into shingles or shingle strips in such a manner that the mineral surfacing will be applied to that portion of the resultant shingles or shingle strips exposed to the weather when laid upon a roof, and the remainder of the shingles or shingle strips not so exposed to the weather be free of mineral surfacing.

Another object of my invention is to provide a method of manufacturing prepared roofing whereby a dry insulating paper or felt may be combined with a water-proof sheet, formed separately, in such a manner that the water-proof sheet will adhere to the fiber and make that side of the paper or felt to which it is applied water-proof without saturating the felt or paper.

Another object of my invention is to provide a method of manufacturing prepared roofing wherein two insulating sheets of felt or other suitable material may be combined with a water-proof sheet formed separately and applied between the two layers of felt in such a manner that it will water-proof the combined sheet and join the two sheets of felt together without impregnating them.

With these and incidental objects in view the invention consists of certain novel methods of manufacture and combination of sequences of operations, the essential elements of which are hereinafter described with reference to the drawings which accompany and form a part of this specification.

This improved method of manufacturing prepared roofing has more or less distinct sets of applications, and for the sake of clearness and simplicity, the specification is divided along these lines, although it is of course understood that the applications are more or less related to each other, and that there may be many variations of these applications without departing from the spirit of this invention.

Figure 1 is a schematic view of the construction used in my general method of preparing improved roofing. Fig. 2 is a perspective view of the construction I employ in preparing striped roofing paper. Fig. 3 is a side elevation of a conventional construction utilized in making roofing paper, varying in thickness in different strips. Fig. 4 is a section taken on the axis of the pulleys 51, Fig. 3. Fig. 5 is a side elevation of the apparatus used in stenciling designs on roofing sheets, and Fig. 6 is a plan view of a portion of the belt shown in Fig. 5. Fig. 7 is a side elevation of a portion of the apparatus used in applying mineral surfacing to longitudinal strips on roofing sheets, and Fig. 8 is a plan view of the belt shown in Fig. 7. Fig. 9 is a plan view of the stencil belt to be used with the apparatus shown in Fig. 7, and Fig. 10 is a plan view of a different style of stencil belt used on the same apparatus. Fig. 11 is a side elevation of a means of cooling the formed sheet and removing the sheet from the belt.

Figure 12:
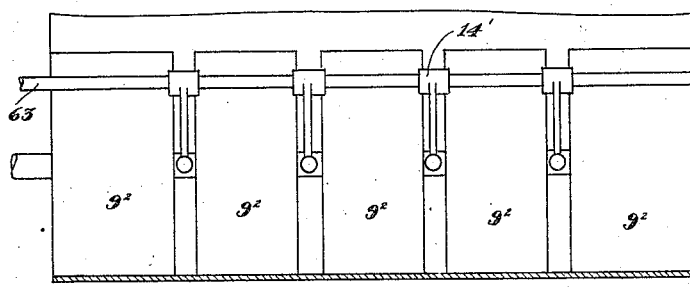
Figure 13:
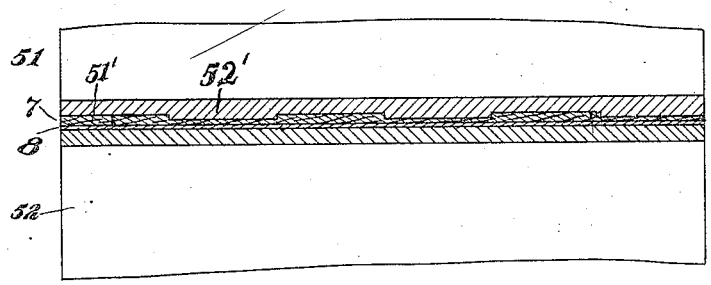

Fig. 12 is a plan view of the vibrators shown in Fig. 11 with the sheet and belt removed and a portion of the roller 9' cut away. Fig. 13 is a section taken through the axis of a pair of rollers (with the major portions of the rollers broken away), used in making prepared roofing of different thickness in different strips of the sheet.

Figure 14:
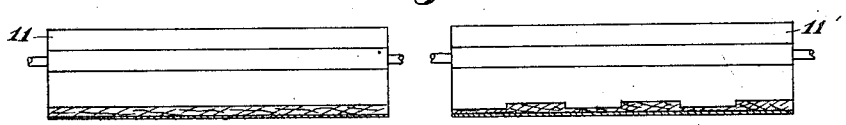

Fig. 14 is a plan view of two styles of scrapers. Fig. 15 is a side elevation of a pair of rollers utilized to combine two sheets of dry felt with the water-proof sheet, and Fig. 16 is a view of the same apparatus, rolling together a single sheet of dry felt and a water-proof sheet. Fig. 17 is a view, partly in section, of a pair of specially prepared rollers used in forming water-proof sheets with sections of differing thickness.

Figure 22:
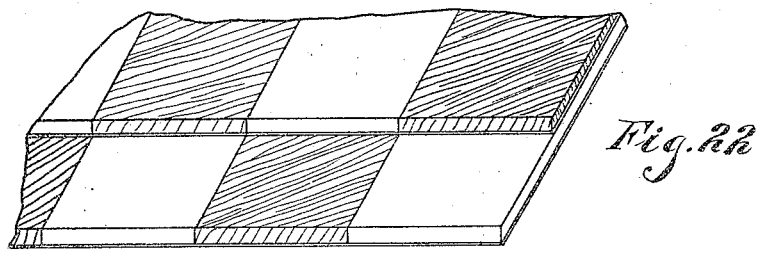
Figure 23:
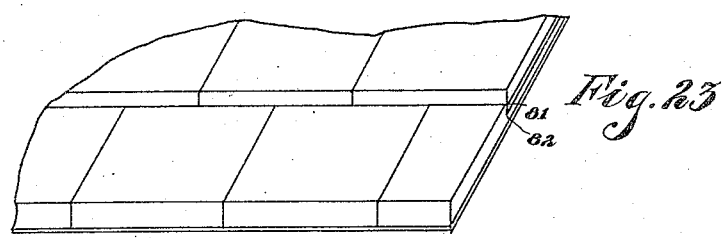
Figure 24:
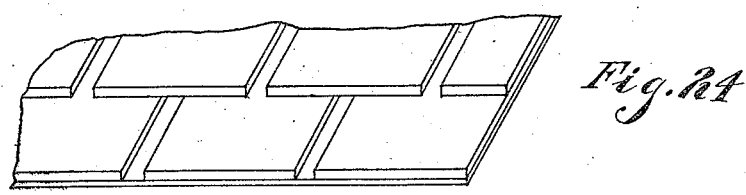

Fig. 18 is a plan view of a belt stenciled out for surfacing certain styles of shingles. Fig. 19 is a perspective view of a construction utilized in forming striped roofing. Fig. 20 is a side elevation of a stenciling apparatus adapted to be used with the apparatus shown in Fig. 1, and Fig. 21 is a plan view of a portion of the two belts shown in Fig. 20. Fig. 22 is a perspective view of a portion of a roof laid with roofing strips made from striped roofing prepared by my method. Fig. 23 is a perspective view of a portion of a roof laid with shingles cut from roofing sheets having some portions of the sheet thicker than other portions. Fig. 24 is a section of a roof laid with shingles cut from sheets stenciled in accordance with my improved method.

Figure 25:
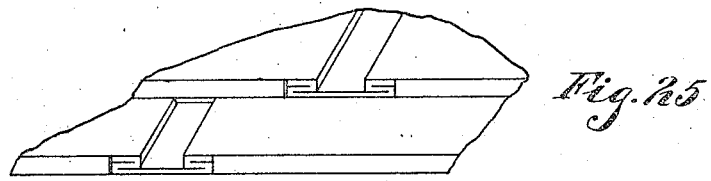
Figure 26:
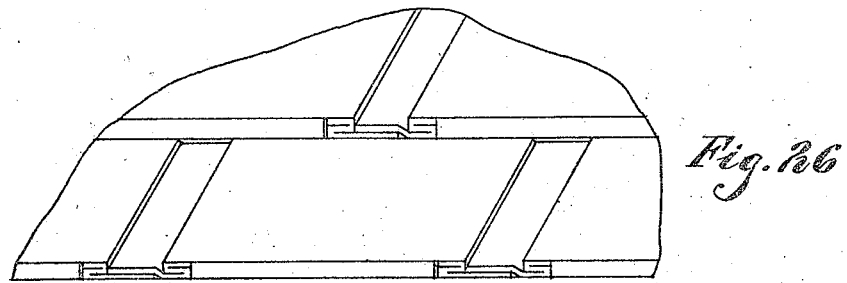

Fig. 25 is a perspective view of a portion of a roof laid with shingle strips cut from sheets stenciled in accordance with my improved method, and Fig. 26 is a similar view of a roof laid with unit shingles cut from sheets stenciled in accordance with my improved method.

Division 1.

Method of making a water-proof sheet and applying it to a foundation sheet.

In the drawings Fig. 1 discloses a machine "A" for making the water-proof sheet hereinafter described, a machine "B" for water-proofing the foundation sheet, and a machine "C" for joining and drying the two sheets thus formed.

In Fig. 1 at "B", 1 is a roll of suitable paper or felt, which is passed by any suitable means through a tank of water-proofing material 2, a series of rollers 3 and 4, serving to keep the paper in the tank a sufficient length of time during its travel to thoroughly saturate it with the water-proofing compound.

A pair of squeeze rollers 5 squeezes all surplus water-proofing compound from the paper, and it then passes to the joining rollers 6, where it is rolled together with a sheet of water-proof and weather-proof compound 7 prepared with the machine shown at "A".

This machine "A" consists essentially of a belt 8, preferably of metal or some hard substance carried by the driving rollers 9, which may be driven by any suitable method, the speed of the sheet 7 being substantially equal to that of the paper 1.

A suitable weather-proof and water-proof compound is deposited from the tank 10 to the metal belt, and is scraped to the desired thickness by the scraper 11, or if desired a pair of rollers may be substituted to answer the same purpose as the scraper.

After the material has been scraped or rolled to the proper thickness it passes on to the vibrator 14, operated in any suitable manner, and water from a pipe 15 is applied to the top of the sheet 7, and the knife 16 flat against the belt lifts the material therefrom and it is passed over the roller 17 down to the squeeze rollers 6, where it joins with the sheet 1, and as both sheets are still sufficiently sticky for the purpose, they are joined together by their own body, and passing over the rollers 18 and 19 are dried by a column of air from the hood 20, and reeled up at 21 to form a roll of completed material.

As the preliminary cooling was done when the water-proof sheet 7 was on the belt 8, the lower side of the sheet 7 is dry at all times, and hence it is impossible for any moisture to be taken up by the sheet 1 when it is combined with the sheet 7 by the rollers 6.

In the formation as described, the reservoir 12, its deposit, and the rollers 13 are to be considered as removed, their function being explained in a further division of the subject.

In the machine "A" the distance between the rollers 9 may be any amount, possibly running up into the hundreds of feet, to allow various means for applying the mineral matter and rolling it into the sheet.

The reservoirs 12 and rollers 13 are shown in the machine "A," Fig. 1, as a means of applying the mineral matter to the water-proof sheet in the simplest form, and together with the vibrator 14 and water pipe 15 constitute a unit "D."

This unit "D" is to be regarded as a removable portion of the machine "A" to be replaced by various devices hereinafter described.

Also the means of cooling may be varied and the method shown in Fig. 11 is the one that I prefer.

In this the belt 8 with the sheet 7 thereon passes through the rollers 132 and therefrom down through the water in the tank 22′, being guided by one or more rollers 5² to determine the length of time they remain in the water, and I provide pipes 61 having jets therein to spray the outer surface of the sheet 7 and wash from it all surplus mineral material, cooling the sheet at the same time.

Passing over the guide roller 62, the sheet and belt continue to the second roller 9, Figs. 9 and 11, where the sheet 7 is separate from the belt 8, and the belt 8 continues to the rollers 9′ and back to the first roller 9, Fig. 1.

The roller 9′, Fig. 11, consists essentially of a series of rollers 9², as shown in Fig. 12, which is a top view of Fig. 11 with the belt removed. All of the sections of the rollers are joined and driven by the same shaft and the vibrator consists of units extending from a common arm or shaft 63 into the openings between the rollers 9² so as to vibrate the entire compound roller 9′ at a point where the sheet 7 is bent on the belt 8 around the periphery of the rollers. At this point the tendency of the sheet 7 will be to leave the belt 8.

The sheet 7 having been raised from the belt 8 by the knife 16 then passes over the roller 17, Fig. 1, and the remainder of the process is as has been heretofore described.

When it is desirable to keep the outside of the belt 8 dry, so as to obviate all possibility of the hot compound foaming when applied thereto, I dispense with all other water cooling tanks and paper and utilize in lieu thereof the spray pipe 81, Fig. 11, which sprays water against the inside of the belt 8, thus chilling the inner surface of the sheet 7 and causing it to come off of the belt freely.

Ordinarily the belt 8 after the sheet 7 has been lifted therefrom passes on from the roller 9, Fig. 1, to a set of guide rollers 4′ and 5′ carrying the belt down into a tank of cooling liquid 22, preferably water.

The water-proof compound deposited on the belt from the reservoir 10 is heated, and as the metal belt is cooled the compound will shrink as it comes into contact with the metal belt, whereas the metal belt will expand from its contact with the hot compound, and this with the rapping of the vibrator and the chilling of the sheet 7 by water is, with most compounds, sufficient to allow the material to be readily lifted from the belt by the knife 16, although as a further precaution, I sometimes employ soap-stone or other similar material, depositing it on the belt from the tank 23 Fig. 1 before the water-proofing compound is applied. In place of the soap-stone, I sometimes apply a thin coating of a hard material, such as a mixture of mostly mineral asphalt from the tank 23, using a scraper similar to 11 to make the sheet very thin, and as this substance becomes very brittle when chilled the sheet of water-proof material 7 applied on top of this hard brittle sheet is easily lifted from the belt 8 by the knife 16.

I sometimes employ as a means for insuring the free lifting of the sheet 7 from the belt 8 by the knife 16, a sheet of thin waxed paper or cloth 8′, which would be carried on top of the belt 8, the materials being deposited on this sheet instead of directly on the belt 8, as shown in the Fig. 1, and this sheet may be an endless belt running over rolls 9′, 5² and 4² through a bath of wax in the tank 22¹ so as to be rewaxed at each revolution if desired.

The ordinary method of water and weather-proofing the foundation sheet is to apply the coating, such as I apply from the reservoir 10, directly onto the foundation sheet, but there are many grades of stock or paper that will not stand the application of a coating at a high melting point as the heat will deteriorate the stock.

It is of course evident that with my method of manufacture it is immaterial what the melting point of the compound is, as it is sufficiently cooled before it is applied to the foundation sheet to obviate the possibility of injury of any kind of stock, and it is also evident that by having a number of different sets of machines, such as "A," I would be able to apply any number of coatings to a foundation sheet in a continuous process and these coatings could be of any consistency and any melting point that I wish.

Division II.

*Water-proof sheet, formed with sections of differing thickness, applied to a foundation sheet.*

As it is sometimes desirable in preparing roofing that is to be used in making shingles to have the sheet thicker in some portions than in others, so that shingles or shingle strips may be made therefrom wherein the bottom of the shingle strips will be thicker than the top, I utilize a variation of my method for preparing such roofing, and disclose means herein for manufacturing roofing that will cut into shingles or shingle strips of varying thickness in two different styles; namely, a shingle wherein the butt is thicker than the top, the thickness diminishing gradually from the butt to the top; the second where approximately half of the shingle at the butt is of a uniform thickness, and the other half at the top is of a uniform thickness that is less than that of the lower half.

In forming the prepared roofing for the first style, I use a pair of specially formed rollers 31, Fig. 17, in place of the rollers 9 in the machine "A."

Fig. 17 is a view, partly in section, of such a roller, the belt 8 and the water-proof compound formed thereon.

The belt 8 is tightly stretched so as to follow the contour of the rollers, and the water-proof compound deposited on the belt from the reservoir 10 will tend to flow so as to seek a level, as shown in Fig. 17 at 33, leaving the compound thicker at 33′ than at 32². The rollers 13 in the machine "A" will of course tend to assist the natural tendency of the compound to seek its level and set itself in the shape as disclosed in the cross section 33, and in case I am using the mineral coating from the reservoir 12, as will be described later, I would use an additional pair of rollers just beyond the scraper 11.

In making the second style of roofing to be cut into shingles of different thickness at different parts of the shingle, I employ a pair of rollers similar to those disclosed in Fig. 13, which is a section taken through the axis of the two rollers, with the major portions of the rollers broken away, as the intention is to show only the contour of the surfaces of the rollers.

The upper roller 51 has a smaller diameter at the portion 51′ than at the portion 52′, and this pair of rollers would be placed in the position on the belt 8 in the machine "A," Fig. 1, occupied by the scraper 11.

I also use a scraper 11′ to accomplish the same result as the rollers 51 and 52, the scraper 11 used in the machine "A," Fig. 1, being shown in a front view in Fig. 14, and as used to form the different thicknesses of water-proofing sheet, being shown at 11′, Fig. 14, the result being obvious.

I also obtain the same result by running the belt 64, Fig. 3, over the pulley 51, in this case the pulley being of uniform diameter throughout, but the belt of different thickness along different longitudinal strips, as shown in Fig. 4, which is a cross section showing the varying thickness of the belt.

When shingles cut from roofing sheets made in this manner are laid upon a roof the appearance is as shown in Fig. 23, the butt 81 of the upper shingle resting snugly in the corner formed at 82 in the lower shingle.

When the sheets 7 made by the machine "A," Fig. 1, are combined with a sheet of foundation stock 1 that has been previously prepared and is not sent through the tank of water-proofing compound 2, and in other cases that might arise I utilize warming ovens to bring the consistency of the sheets to such a point that they will be readily united, one oven 141, Fig. 1, being so disposed as to warm the foundation sheet; another oven, 142, being so disposed as to re-warm the water-proof sheet 7; and a third oven 143 being utilized to re-warm the compound sheet, or I may warm the rollers 6 themselves, the manner of applying the heat being readily adjustable to the requirements.

Division III.

*Method of making a water-proof sheet, surfacing it with mineral matter and applying it to a foundation sheet.*

By the term "mineral surfacing," as used in this specification, I refer to that surfacing often applied to prepared roofing, which consists of finely divided particles of slate, mica, sand, or any such substance, and not to a coating of asphalt, which might technically be regarded as a mineral surfacing.

In the ordinary method of manufacture where a mineral surfacing is applied, the stock which would correspond to the paper 1, Fig. 1, has a coating of water-proof compound applied thereto and there is then deposited on this resultant sheet a mineral surfacing, which is rolled in order to embed it firmly in the water-proof coating, and by the weight or pressure of the rollers on the particles of mineral matter, the paper is often bruised or broken through so as make serious defects in the sheet, and as it is almost impossible to detect this until the roofing has been in service for some time, it is one of the most serious troubles experienced in the manufacture of mineral covered roofing.

This defect is entirely overcome in my method on account of the manner in which the mineral surfacing is applied, and constitutes a great improvement in the art of making mineral surfaced roofing.

When I make the mineral coated roofing I use the same method of manufacture, as disclosed under Division I, except that I then use the reservoir 12, and deposit therefrom on the sheet 7, machine "A," Fig. 1, the mineral surfacing and roll it into the sheet by means of the rollers 13.

As the water-proof coating is then on the belt 8, which is hard, the larger particles are crushed and the rollers 13 level up the mineral surfacing, the process continuing as explained in Division I, and the sheet 7 having the mineral surfacing thereon is rolled together with the foundation sheet 1 by the rollers 6 with a light pressure, giving me a mineral surfaced roofing sheet with a perfect foundation sheet.

Moreover, if there are any lumps or knots in the foundation sheet itself, these will pass through the rollers 6, without injuring the paper or water-proof sheet, as no excessive pressure is required on these rollers.

Division IV.

*Forming a striped roofing through the method of applying either the water-proof sheet or the mineral surfacing.*

A considerable quantity of prepared roofing is used at the presnt time in making design roofs, either as designs on the roofing sheets, or marked by colors or otherwise, so as to form designs when the sheets are cut into shingle strips or unit shingles, and my method of manufacture is especially applicable to this line of the art.

In Fig. 2 the foundation sheet 1 is prepared, as shown in "B", Fig. 1, or in any other suitable manner, and two sheets of composition prepared by machines similar to "A", Fig. 1, are slitted at the point 17, Fig. 1, by circular knives, shown in conventional form at 24, Fig. 2, the result being strips of the water-proof compound sheet, and as any desired color of water-proof compound may be used in the reservoir 10, Fig. 1, these strips may be slit from sheets of various colors, so that the strips 1' may be red, for instance, and the strips 2, blue, and they are then combined by means of the rollers 25 with the sheet 1, as shown in Fig. 2, to form the completed striped roofing paper, as shown at 26, the strips being still sufficiently sticky to amalgamate perfectly at their edges.

It is evident that the remaining strips from the cutters may be extended, as shown at 27 and 28, and joined by another pair of rollers similar to 25 to a second sheet of foundation paper, similar to 1.

By making shingle strips from this striped roofing, I obtain a desirable effect for roofing purposes, as shown in a section of a roof laid with this kind of shingle strips in Fig. 22.

It is evident of course that the manner of slitting and the relative size of resultant strips may be varied, and any number of colors may be combined in this manner.

I also form a striped roofing by applying the mineral matter to longitudinal strips of the sheet, accomplishing this by replacing the unit "D" of machine "A", Fig. 1, with a unit "D'", as disclosed in Fig. 7, which is a side elevation of the unit, Fig. 8 being a plan view of the belt 53 used in the unit "D'".

Carried by the rollers 54, the belt 53 comprises a number of individual belts 53' with spaces 54' between them.

A reservoir 12' having openings $12^2$ for the spaces 54' deposits mineral matter on the composition sheet 7 in the machine "A", Fig. 1. Scrapers 55 throw off from the individual belts 53' any mineral matter that might be scattered thereon.

The mineral matter on the longitudinal strips of the sheet 7 between the individual belts 53' is embedded into position by the squeeze rollers 13', the additional scraper 56 being placed beyond the squeeze rollers 13' to remove all surplus mineral matter from the belt before the second roller 54 is reached.

The operation of making this sheet and uniting it with the foundation sheet 1 is the same as described in the first division, and the result is a piece of striped roofing which may be cut into shingle strips and show the general style disclosed in Fig. 22.

In Fig. 19 I show still another variation of my method as applied to forming striped roofing, in which machine "A", Fig. 1 is replaced by a machine, as shown in Fig. 19, wherein 109 is a pair of rollers carrying a metal belt 108, similar to machine "A", but the machine disclosed in Fig. 19 has running along the upper surface of the belt 108 a number of thin flat metal ribbons 115, running the length of the belt 108, all of them being shown broken off, except the one marked 115', which is shown turning around a pair of mule shafts 116 at one end, and a second pair 117 at the other end, to indicate the manner in which the endless belts would be returned, so as to always travel over the top of the belt 108 in a vertical position.

A multiple reservoir 110 delivers water-proof compound in the usual manner, except that there are individual spouts delivering the compound in the channels formed between the metal ribbons 115, and the scraper 111 scrapes off the compound in the usual way, while the multiple reservoir 112 is provided for depositing mineral matter, and rollers 113 embed the mineral surfacing in the compound deposited on the belt 108.

The metal ribbon 115 may be of considerable height, in which case the rollers and the scraper would be cut out so as to allow them to pass down between the ribbons, in order to operate on the surface of the roofing sheet, or the ribbons may be of the same height as the thickness of the coating, in which case the scraper and rollers would be of the usual construction.

It is evident from the machine shown in Fig. 19 that different colors of compound may be delivered from the various compartments of reservoir 110, thus making striped roofing with the stripes in the compound itself, or a uniform color may be used in the compound and different colors of mineral surfacing applied from reservoir 112, or both of these methods may be combined, the mineral surfacing being applied on colors in some of the strips, and the coloring of the strips not so covered with mineral surfacing being varied by the compound itself.

It is evident that the metal ribbons running on beyond the place where the sheet of compound 7 is lifted from the belt are held vertical until they are free from the sheet 7 and the turn on the mule shaft is then made.

*Division V.*

*Designs including stencil designs on roofing sheets and designs for shingle strips and unit shingles cut from roofing sheets.*

A great many attempts have been made in the past to form designs on the prepared roofing by applying thereto mineral surfacing materials, but these attempts have not been entirely satisfactory in the past, as the tendency has always been for the colors to run together, or the mineral would be of different thicknesses at different parts of the sheet, and in all cases the waste mineral matter naturally falling from the sheet in the process would consist of different colored substances mixed together, which of course could not be used again.

In one variation of my improved method of making mineral surfaced roofing, I employ units "G" and "H". Unit "G" consists of an endless belt 40, Fig. 5, which is a side elevation of the apparatus used in this application of my invention, driven by any suitable means by rollers 41 and having a portion of the design that is to be impressed on the completed roofing stenciled out in the belt, as shown in the plan view of a section of the belt at Fig. 6, in its simplest forms consisting merely of apertures 42 evenly spaced along the belt. Another set of similar rollers and belt is shown in Fig. 6, having apertures 42′ in the belt spaced differently than the apertures 42 in the belt 40, and it is evident that any design may be similarly worked out, the belts 40 and 40′, and rollers 41 and 41′ being driven at the same speed.

With this method I use a sheet of waterproof compound formed from a machine similar to "A", Fig. 1, but having the unit "D" replaced by sets "G" and "H", and the mineral matter is deposited on the sheet 7 through the apertures 42 and 42′, Fig. 6, one color; for instance, red, being deposited through the apertures 42, and a different color; for instance, blue, being deposited through the apertures 42′, and will be firmly embedded at the respective points in the sheet 7 by the squeeze rollers 44 and 44′.

It is not necessary to attempt to drop the material directly into these apertures during the continuous travel of the sheet 7, as it may be deposited all over the inner surface of the belt 40 and 40′, the surplus being scraped and blown off after the rollers 44 and 44′ have embedded the mineral matter into the sheet by scrapers 45, 45′, and blowers 46 and 46′ respectively.

The result of the sheet 7 passing through the sets "G" and "H" during the operation of the machine "A", Fig. 1, would of course be a sheet of roofing with red and blue disks of the size of the apertures in the belt and of a thickness corresponding to the thickness of the belt spaced uniformly throughout its length.

It is evident that this allows waste matter to be collected from each unit, and as the colors are not mixed this may again be used without loss.

It is also evident that the sheet may be passed through a number of units similar to "G" and "H", so that the design may be amplified and the entire surface of the sheet covered, if so desired.

In Fig. 18 I show a section of a belt stenciled out at points 71, 72 and 73, in such a manner that when the unit shingles are cut from a strip stenciled with this belt, and the unit shingles are formed in accordance with my Patent No. 1,213,472, dated January 23, 1917, for shingles, the surfaces 71, 72 and 73 will be that portion of the unit shingles exposed to the weather, and this portion will have a mineral surface thereon, while the remainder of each shingle will be free from mineral surfacing, and this remainder of the shingles will be that portion not exposed to the weather, as fully shown in Fig. 26, which is a section of a roof laid with unit shingles made in accordance with my co-pending application, Serial #71,312, from roofing having mineral surfacing stenciled thereon, in accordance with Fig. 18.

Similarly the stencil shown in the belt in Fig. 10 is adapted to form a sheet of prepared roofing having mineral surfacing on that portion exposed to the weather in shingle strips cut from such sheets, and folded in accordance with my co-pending application, Serial #71,312, and as shown in Fig. 25, which is a section of a roof laid with such shingle strips. Similarly, Fig. 9 discloses a stencil adapted to be used in putting a mineral surfacing on a sheet of prepared roofing in such manner that unit shingles cut therefrom will have all of that portion exposed to the weather covered with a mineral surfacing, as better shown in Fig. 24, which represents a portion of a roof laid with such shingles.

In a similar manner by replacing the unit "D", machine "A", Fig. 1, with unit "M", Fig. 20, I obtain the stenciling effect in a still different manner, this latter construction being an alternative to the one shown in Fig. 5, which is my preferred construction.

In the machine "M", a pair of rollers 91 carry a stenciling belt 92 similar to the stenciling belt 40, Fig. 5, and a pair of rollers 93 mounted inside of the stenciling belt 92, carry a second stenciling belt 94, which corresponds to the stenciling belt 40', Fig. 5.

Similar to the construction disclosed in Fig. 5, a reservoir 95, deposits mineral surfacing matter on the larger belt, which is rolled into position by the rollers 96, and the surplus being scraped off by the scraper 97.

It is evident that as the distance between the rollers 9, Fig. 1, may be any amount, any number of stenciling belts may be combined, as shown in Fig. 20, and any type of stencil worked out through this method.

Division VI.

*The application of the water-proof sheet as applied to roofing insulation, siding, sheeting, damp courses for walls, etc.*

In applying my method to the manufacture of roofing, sheeting or siding, where heat insulating qualities are required, I roll with a sheet of felt 30, Fig. 16, a sheet of semi-plastic water-proof material 7 by means of the squeeze rollers 29, which replace the rollers 6, Fig. 1, and it is evident that as the sheet 7 is still more or less plastic, the felt will be thoroughly stuck to the water-proof sheet, the result being a dry unimpregnated sheet of felt on one side, with a water-proof sheet on the other side, and in Fig. 15 I show a similar manner of combining two sheets of felt 30 with a water-proof compound 7.

It is evident that paper or other material may be employed in place of the felt, and any fibrous or woven material will be thoroughly combined with the sheet 7 through its joining with the fibers of the material used.

Claims:

1. The method of making prepared roofing, comprising the formation of strips of different colored water-proofing compound and joining these strips of different colored water-proofing compound on a foundation sheet separately prepared, so as to form a sheet of roofing material having a striped pattern.

2. The method of making roofing material comprising the forming of strips of water-proof compound of various colors and joining them together at their edges to form striped roofing material.

3. The method of making roofing material comprising the forming of strips of water-proof material of various colors, joining said strips in desired designs on to a sheet of foundation stock previously prepared.

4. The preparation of roofing material comprising the formation of strips of water-proof compound and applying thereto mineral surfacings of different colors.

5. The method of preparing roofing material comprising the formation of strips of water-proof material, applying to said strips, mineral surfacings of different colors on different strips and joining said strips at their edges to form a striped mineral surfaced roofing material.

6. The method of making roofing material comprising the forming of strips of water-proof compound, applying on different strips, mineral surfacings of different colors, joining onto a foundation sheet separately prepared, said strips having various colored mineral surfacings thereon, to form a striped roofing sheet.

7. The method of making striped roofing material comprising the amalgamation at the edges thereof of strips of roofing material having different colored mineral surfacings on different strips.

8. The method of forming striped roofing material comprising the joining onto a sheet of foundation stock, strips of roofing material having various colored surfaces on different strips.

SILAS M. FORD.